(12) United States Patent
Asbach et al.

(10) Patent No.: US 8,251,083 B2
(45) Date of Patent: *Aug. 28, 2012

(54) SYSTEMS FOR PREVENTING OVERINFLATION OF INNER TUBES AND CHILDREN'S RIDE-ON VEHICLES INCLUDING THE SAME

(75) Inventors: Ronald M. Asbach, Grand Island, NY (US); William R. Howell, Arcade, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,572

(22) Filed: Mar. 7, 2011

(65) Prior Publication Data

US 2011/0159778 A1 Jun. 30, 2011

Related U.S. Application Data

(63) Continuation of application No. 12/355,588, filed on Jan. 16, 2009, now Pat. No. 7,918,240.

(60) Provisional application No. 61/133,759, filed on Jul. 1, 2008.

(51) Int. Cl.
*F16K 17/14* (2006.01)
(52) U.S. Cl. ........ 137/67; 137/68.29; 137/224; 152/415
(58) Field of Classification Search .................. 152/415, 152/DIG. 7, DIG. 11; 137/67, 68.19, 68.23, 137/68.29, 71, 224–255
See application file for complete search history.

(56) References Cited

U.S. PATENT DOCUMENTS

| | | | |
|---|---|---|---|
| 1,115,978 | A | 11/1914 | Schweinert et al. |
| 2,099,642 | A | 11/1937 | Overturf |
| 2,289,072 | A | 7/1942 | Ross |
| 3,651,455 | A | 3/1972 | Hurlbutt et al. |
| 4,235,255 | A | 11/1980 | Hughes |

(Continued)

FOREIGN PATENT DOCUMENTS

GB 2437071 A 10/2007
(Continued)

OTHER PUBLICATIONS

Chicago Bike Blog: The anatomy of a bicycle wheel, Jun. 26, 2008, 7 pages, www.chicagobikeblog.com.
(Continued)

*Primary Examiner* — Jason Bellinger
(74) *Attorney, Agent, or Firm* — Dascenzo Intellectual Property Law, P.C.

(57) ABSTRACT

A system for preventing overinflation of an inner tube is disclosed. In some embodiments, the system may include a wheel; and a tube-bursting region of the wheel, wherein the tube-bursting region is configured to facilitate bursting of an associated inner tube when the associated inner tube is pressurized above a predetermined maximum pressure. A tire system also is disclosed. In some embodiments, the system may include a wheel; and a tube-bursting region of the wheel, wherein the tube-bursting region is configured to facilitate bursting of an associated inner tube when the associated inner tube is pressurized above a predetermined maximum pressure. A children's ride-on vehicle also is disclosed. In some embodiments, the vehicle may include a wheel; and a tube-bursting region of the wheel, wherein the tube-bursting region is configured to facilitate bursting of an associated inner tube when the associated inner tube is pressurized above a predetermined maximum pressure.

25 Claims, 6 Drawing Sheets

U.S. PATENT DOCUMENTS

| | | | |
|---|---|---|---|
| 4,269,214 A | 5/1981 | Forsythe et al. | |
| 4,938,272 A | 7/1990 | Sandy, Jr. et al. | |
| 5,054,511 A | 10/1991 | Tuan et al. | |
| 5,275,196 A | 1/1994 | Mitchell et al. | |
| 5,988,245 A | 11/1999 | Rosenberg | |
| 6,408,913 B1 | 6/2002 | Caretta et al. | |
| 6,446,653 B2 | 9/2002 | Cullinane et al. | |
| 6,771,034 B2 * | 8/2004 | Reile et al. | 318/139 |
| 6,810,915 B2 | 11/2004 | Umetsu et al. | |
| 6,923,200 B2 | 8/2005 | Gonzaga | |
| 6,948,516 B1 | 9/2005 | Williams | |
| 7,918,240 B2 * | 4/2011 | Asbach et al. | 137/67 |
| 2005/0056474 A1 | 3/2005 | Damon | |

FOREIGN PATENT DOCUMENTS

| | | | |
|---|---|---|---|
| JP | 2003127621 A | 5/2003 | |

OTHER PUBLICATIONS

English-language abstract of Japanese Patent No. JP 2003127621 A, European Patent Office, May 8, 2003.

* cited by examiner

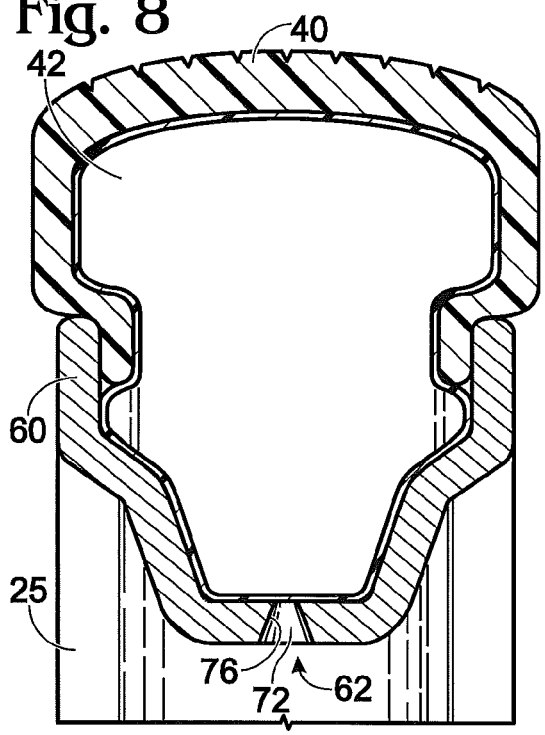
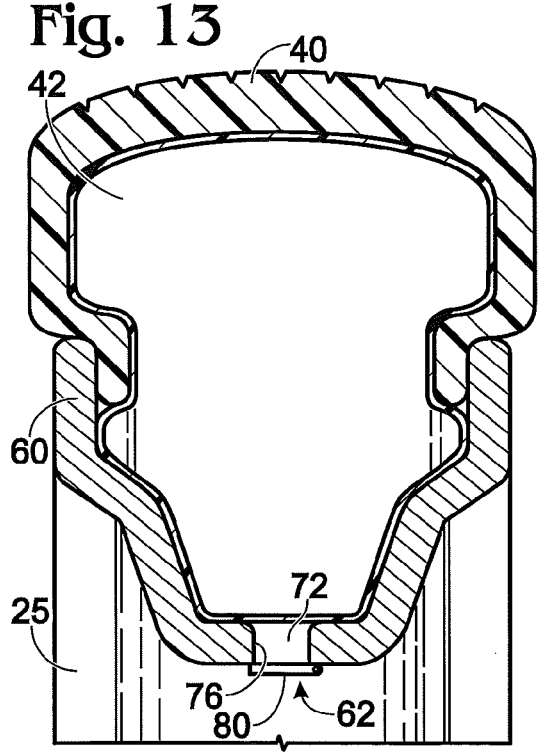
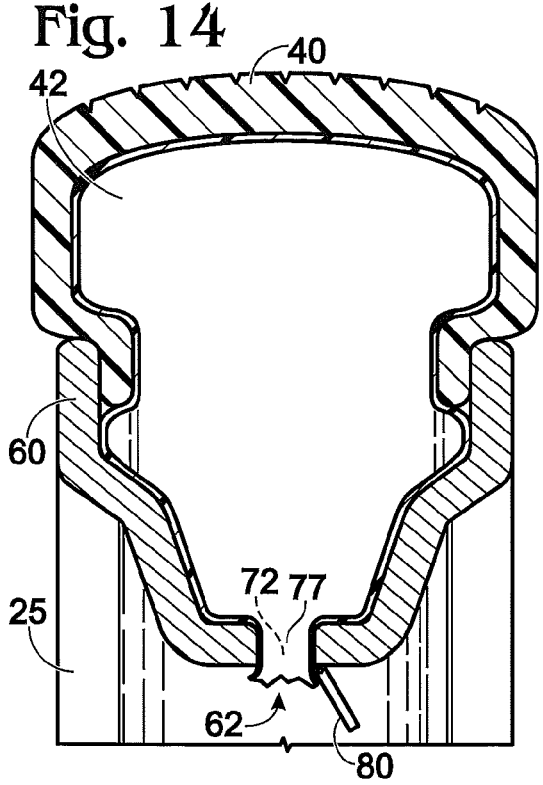

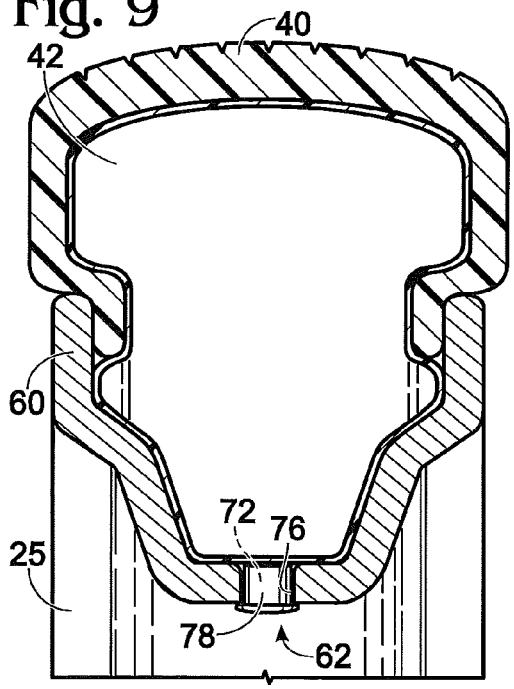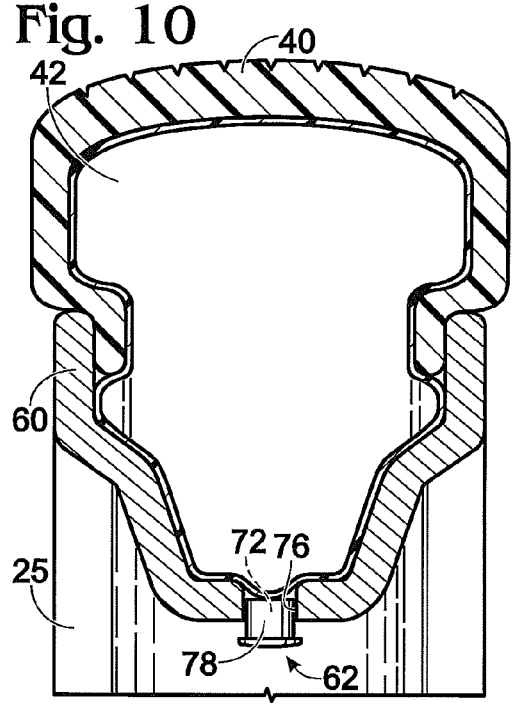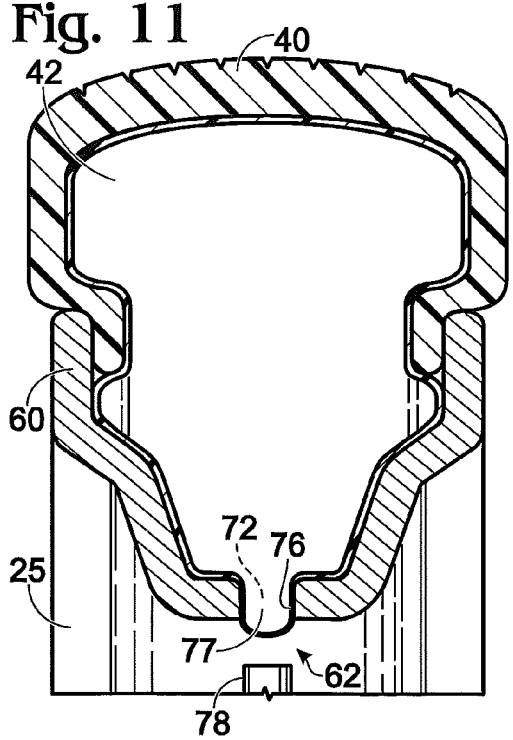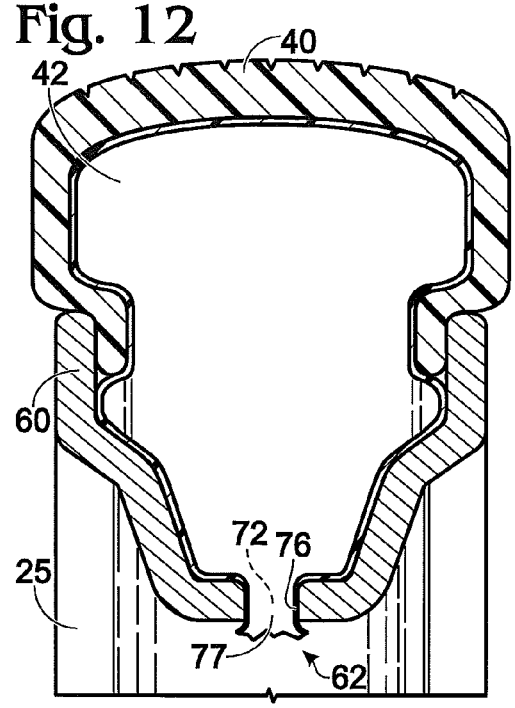

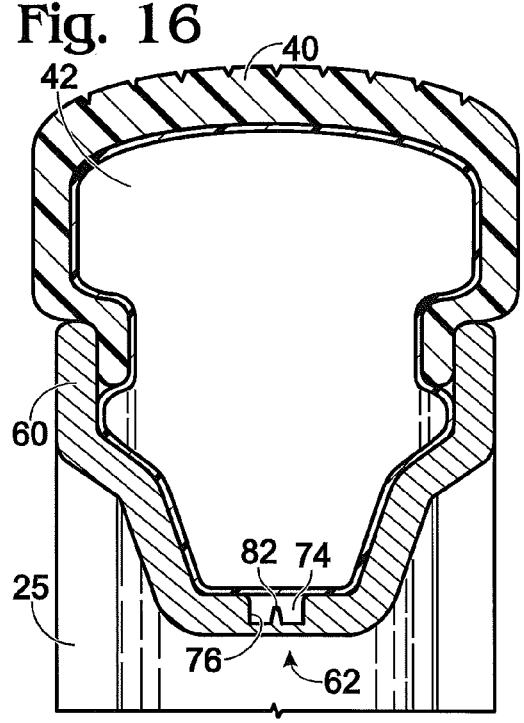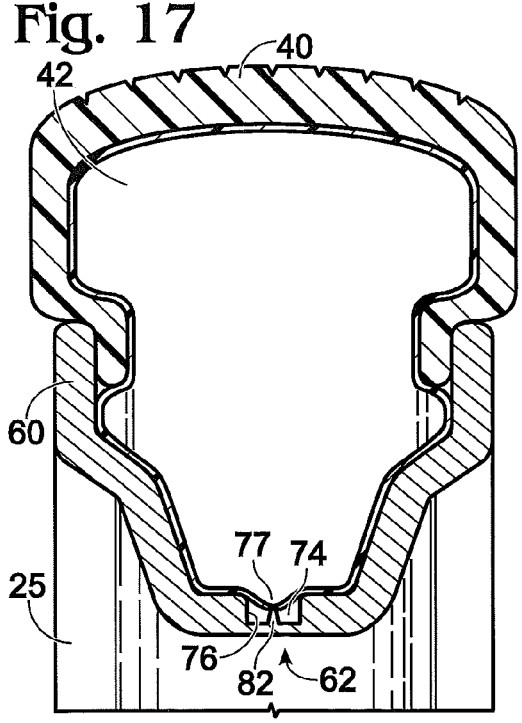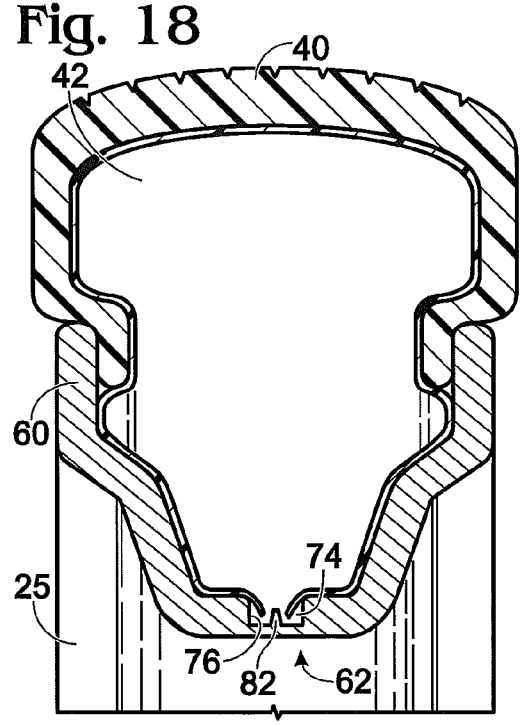

SYSTEMS FOR PREVENTING OVERINFLATION OF INNER TUBES AND CHILDREN'S RIDE-ON VEHICLES INCLUDING THE SAME

RELATED APPLICATIONS

The present application is a continuation of, and claims priority under 35 U.S.C. §120 to, U.S. patent application Ser. No. 12/355,588, which was filed on Jan. 16, 2009, and which claims priority under 35 U.S.C. §119(e) to U.S. Provisional Patent Application Ser. No. 61/133,759, which was filed on Jul. 1, 2008. The complete disclosures of the above-identified applications are hereby incorporated by reference.

BACKGROUND OF THE DISCLOSURE

The present disclosure is directed to systems for preventing overinflation of inner tubes, tire systems, and children's ride-on vehicles having one or more of those systems. Examples of systems for preventing overinflation of inner tubes include U.S. Pat. Nos. 6,948,516; 6,923,200; 6,810,915; 6,446,653; 6,408,913; 5,988,245; 5,275,196; 5,054,511; 4,269,214; 4,235,255; 3,651,455; and 2,099,642. The complete disclosures of the above patents are herein incorporated by reference for all purposes.

SUMMARY OF THE DISCLOSURE

The present disclosure is directed to systems for preventing overinflation of an inner tube, tire systems, and children's ride-on vehicles including one or more of those systems.

The systems for preventing overinflation of an inner tube may, in some embodiments, include a wheel; and a tube-bursting region of the wheel, wherein the tube-bursting region is configured to facilitate bursting of an associated inner tube when the associated inner tube is pressurized above a predetermined maximum pressure.

The tire systems may, in some embodiments, include a wheel including a rim; a tire coupled to the rim; and an inner tube, at least a portion of the inner disposed between the rim and the tire, wherein the wheel includes a tube-bursting region configured to facilitate bursting of the inner tube when the inner tube is pressurized above a predetermined maximum pressure.

The children's ride-on vehicles may, in some embodiments, include a body having at least one seat sized for a child; a plurality of wheels rotatably coupled to the body, wherein at least one wheel of the plurality of wheels includes a tube-bursting region; a tire coupled to the at least one wheel; and an inner tube, at least a portion of the inner tube disposed between the at least one wheel and the tire, wherein the tube-bursting region is configured to facilitate bursting of the inner tube when the inner tube is pressurized above a predetermined maximum pressure.

BRIEF DESCRIPTION OF THE DRAWINGS

FIG. 8 is a partial view of the wheel of FIG. 4 shown with another example of a tube-bursting region.

FIG. 9-12 are sectional views of the wheel of FIG. 3 taken along lines 4-4 in FIG. 2, showing the tube-bursting region of FIG. 3 with an example of a plug.

FIG. 13 is a partial view of the wheel of FIG. 4 shown with an example of a cover for the passage of FIG. 4 in a closed position.

FIG. 14 is a partial view of the wheel of FIG. 4 shown with the cover of FIG. 13 in an open position.

FIGS. 16-18 are sectional views of the wheel of FIG. 15 taken along lines 4-4 in FIG. 2, showing an inner tube bursting to prevent overinflation.

DETAILED DESCRIPTION OF THE DISCLOSURE

Figure 1:
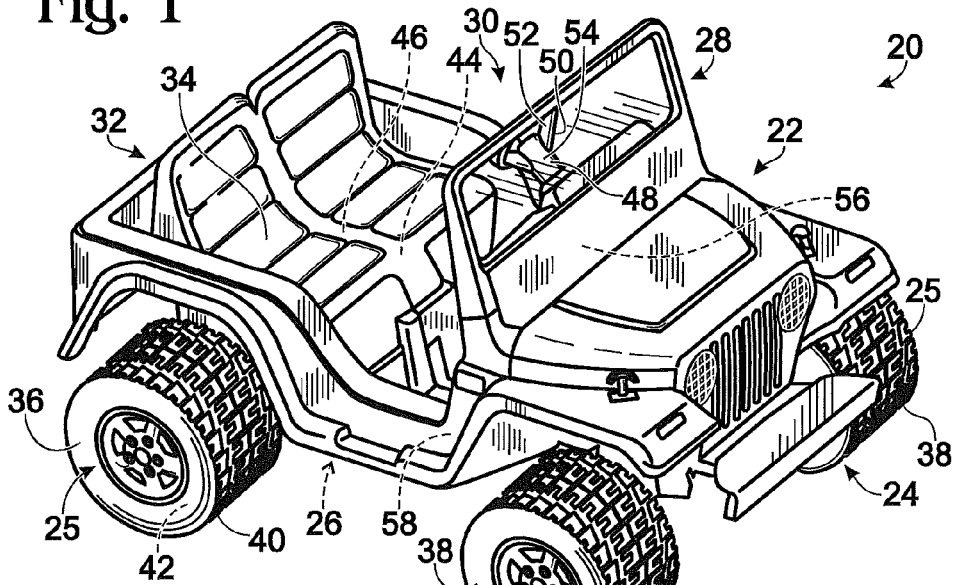
FIG. 1 is an isometric view of a children's ride-on vehicle including at least one system for preventing overinflation of an inner tube.
Figure 2:
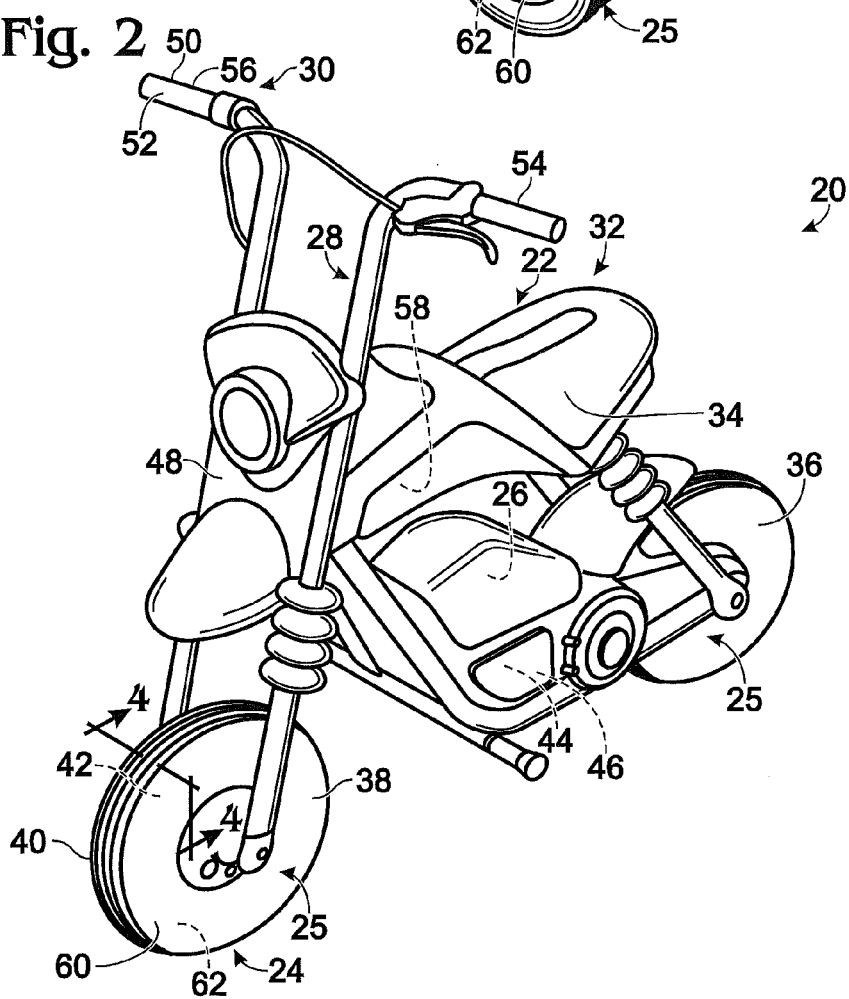
FIG. 2 is an isometric view of another children's ride-on vehicle including at least one system for preventing overinflation of an inner tube.

Examples of children's ride-on vehicles are shown in FIGS. 1 and 2 and indicated generally at 20. Children's ride-on vehicles 20 may include any suitable structure configured to allow a child riding on the vehicle to move across any suitable support surface. For example, two different children's ride-on vehicles are shown in FIGS. 1 and 2, yet each of these versions may include a body 22, a wheel assembly 24, a drive assembly 26, a steering assembly 28, and a control assembly 30.

The body may include any suitable structure configured to support one or more other components of the children's ride-on vehicle. For example, the body may include at least one seat assembly 32 that is sized and configured to accommodate at least one child. Seat assembly 32 may have any suitable configuration, including configurations in which the position of the seat assembly is adjustable within the passenger compartment, and configurations in which the seat assembly includes one or more seats or one or more seating regions.

Vehicle 20 may be sized for use by a child driver. Alternatively, the vehicle may be sized for use by a child driver and a child passenger. For example, seat assembly 32 may include one or more seats or seating regions 34 that are sized and positioned to receive a child driver and/or one or more child passengers. Alternatively, the seat assembly may include only a single seat or seating region.

Additionally, body 22 may be formed from any suitable materials. For example, the body may be formed from molded plastic and/or may be integrally formed or formed from a plurality of parts that may be secured together by screws, bolts, clips, and/or other suitable fasteners. Body 22 may additionally, or alternatively, be at least partially formed from other suitable material(s), such as metal, wood, and/or composite materials.

Moreover, the body may be shaped to generally resemble any suitable vehicle. For example, body 22 may be shaped to generally resemble an all-terrain vehicle. Alternatively, the body may be shaped to resemble corresponding full-sized, or adult-sized, vehicles, such as cars, trucks, construction vehicles, emergency vehicles, off-road vehicles, motorcycles, space vehicles, aircrafts, watercrafts, etc. Additionally, or alternatively, body 22 may be shaped to resemble fantasy vehicles that do not have a corresponding adult-sized counterpart.

Wheel assembly 24 may include a plurality of wheels 25 rotatably coupled to the body and/or configured to rotatably support the body on a support surface. For example, the plurality of wheels may include at least one driven wheel 36 and/or at least one steerable wheel 38. "Driven wheel," as used herein, refers to a wheel that is rotated directly in response to a rotational input from the vehicle's drive assembly, which is either directly conveyed to the wheel by the output of the motor(s) or conveyed through linkage, such as a gearbox, belt, chain, gear assembly, axle, etc.

The driven wheel may be configured to be driven by drive assembly 26 at any suitable speed(s) and/or direction(s). Steerable wheel 38 may be configured to be steered by steering assembly 28 toward any suitable direction(s).

The wheel assembly may include any suitable number of wheels, such as two wheels, three wheels, four or more wheels. A four-wheeled ride-on vehicle is illustrated in FIG. 1, and a two-wheeled ride-on vehicle is illustrated in FIG. 2. Any combination of those wheels may be driven and/or steerable. For example, when the plurality of wheels includes two front wheels and two rear wheels, all wheels may be driven (all-wheel drive configuration) with one or more of those wheels being steerable. Alternatively, the two front wheels may be steerable and the two rear wheels may be driven (rear-wheel drive configuration), or vice-versa (front-wheel drive configuration).

In some embodiments, wheel assembly 24 may include one or more tires 40 coupled to the wheels, and/or one or more inner tubes 42. At least a portion of the inner tubes may be disposed between the wheel and the tire. The tires and/or inner tubes may be on each of the wheels or on less than all of the wheels. For example, only the front and/or rear wheel(s) may have tires and/or inner tubes. In some embodiments, a wheel, a tire coupled to the wheel, and an inner tube may be referred to as a "tire system."

Drive assembly 26 may include any suitable structure configured to selectively drive the rotation of the at least one driven wheel. For example, the drive assembly may include at least one motor 44 and at least one power supply 46. The motor may be configured to drive the rotation of at least one of the driven wheels of the plurality of wheels. The motor may be described as providing an output that provides a rotational input to the driven wheel(s). The output may include one or more of a rotating shaft and/or a rotation pinion or output gear.

The drive assembly may include any suitable number of motors 44. For example, the drive assembly may include a single motor to drive the driven wheels. Alternatively, the drive assembly may include two motors where a first motor may drive a subset of the plurality of wheels, such as a first pair of a front wheel and a rear wheel, while a second motor may drive another subset of the plurality of wheels, such as a second pair of a front wheel and a rear wheel. Alternatively, drive assembly 26 may include more than two motors.

Motor 44 may additionally power other moveable components of vehicle 20. For example, the motor may power one or more components of a mechanical assembly (not shown). In some embodiments, the motor may move one or more mechanical members of the mechanical assembly. For example, the motor may move one or more of the mechanical members between extended and/or retracted positions.

Power supply 46 may include any suitable structure configured to provide power to the drive assembly. For example, the power supply may include one or more rechargeable batteries, capacitors, etc. Power supply 46 may be operably connected to the motor by any suitable electrical connectors, such as cables, wires, positive and negative terminals or leads, etc.

The drive assembly may additionally, or alternatively, be configured to receive driving inputs from a user, such as via control assembly 30, and to convey those driving inputs to the plurality of wheels. When the power supply includes one or more batteries, the drive assembly may be referred to as a "battery-powered drive assembly."

Although drive assembly 26 is shown to include motor 44 and power supply 46, the drive assembly may additionally, or alternatively, include any suitable components and/or assemblies configured to selectively drive the rotation of the at least one driven wheel. For example, drive assembly 26 may include a motor output linkage that transmits the rotational input from the motor's output(s) to the driven wheels. The linkage may include an intermediate linkage between the output and the driven wheel(s), such as a gearbox containing one or more gears, a belt or chain drive, a worm gear, one or more individual gears, etc.

Additionally, or alternatively, the motor output linkage may be configured to transmit the rotational input from the motor(s) to the driven wheel(s) at the same relative rate of rotation, or it may mechanically augment the rotational input to convey a greater or lesser rate of rotation relative to the rate of rotation of the output of the motor(s). Alternatively, the drive assembly may be formed without the motor output linkage, in which case the output(s) of the motor(s) may directly transmit the rotational input to the driven wheel(s).

Steering assembly 28 may include any suitable structure configured to selectively steer the at least one steerable wheel. For example, the steering assembly may include at least one steering column 48 and/or other mechanical linkage that receives steering inputs from control assembly 30 and steers one or more of the steerable wheels based, at least in part, on the steering inputs. The steering column may, for example, include an end portion distal the steering mechanism, with that end portion being coupled via a suitable tie rod or steering linkage, to steering collars, or steering levers, associated with one or more steerable wheels.

Control assembly 30 may include any suitable structure configured to receive user inputs and/or to convey those inputs to drive assembly 26 and/or steering assembly 28. For example, control assembly 30 may include a user interface 50 configured to receive user inputs, such as driving and/or steering inputs. The user interface may include one or more user control devices or user input devices 52. For example, the user input devices may include a steering mechanism 54, which may be any suitable structure configured to steer one or more of the steerable wheels via user-applied steering inputs to the steering mechanism. The steering mechanism may, for example, be in the form of steering wheel(s), handlebar(s), and/or steering lever(s).

Additionally, user input devices 52 may include one or more drive actuators 56, which may include any suitable structure configured to selectively energize the motor(s) responsive to a user input directing the power supply(ies) to actuate or otherwise energize the motor(s). For example, the drive actuators may include an on/off switch, a foot pedal, a throttle lever, and a rotational handgrip on a steering mechanism that includes a handlebar.

The user inputs, such as those conveyed via one or more of the drive actuators, may be adapted to select, or configure, the drive assembly within a plurality of drive configurations. Those user inputs may be referred to as configuration inputs and may be adapted to enable, or select, one or more of a plurality of drive configurations. Similarly, the drive actuator (s) utilized to receive the configuration inputs from a user, such as a child sitting on the ride-on vehicle's seat, may be referred to as configuration input devices.

The plurality of drive configurations may be realized, or implemented, when the motor(s) is energized, such as responsive to actuation/energization of the motor(s) by the battery (ies). For example, the plurality of drive configurations may include one or more of the direction (forward or reverse) in which the drive assembly may propel the vehicle upon energization of the motor(s), the relative speed or range of speed which the motor(s) may be configured/energized to provide, and/or whether the drive assembly may be able to be actuated responsive to an actuation input to drive actuator 56.

For example, speed drive configurations, such as "high" and "low" speed configurations, "high," "medium," and "low" speed configurations, etc., may be selected with one or more drive actuators, such as in the form of a speed switch. Those speed drive configurations may be realized (i.e., the vehicle may be propelled according to the selected speed drive configuration) upon actuation or energization of the motor(s). The speed drive configurations may include a plurality of relative speed configurations, such as a first speed configuration, a second speed configuration that is greater than the first speed configuration, and optionally at least a third or more speed configurations that is/are greater than the second speed configuration.

As another example, direction drive configurations, such as forward and reverse drive configurations, may be selected by drive actuator 56, such as in the form of a direction switch. The direction switch may enable a user to select the relative direction (i.e., clockwise or counterclockwise) of rotation and thereby configure the vehicle to drive in forward and reverse directions upon energization of the motor(s).

A further example of drive configurations may be referred to as power configurations and may relate to whether or not the drive assembly's motor(s) is in an energized state in which the motor assembly may be driving the rotation of the driven wheel(s), or a de-energized state in which the motor(s) may not be driving the rotation of the driven wheel(s). In other words, when in the de-energized drive configuration, the motor(s) does not drive the rotation of the ride-on vehicle's driven wheel(s).

As an example, the drive assembly may be selectively configured from a de-energized drive configuration to an energized drive configuration responsive to a user, such as a child sitting on a seat of the ride-on vehicle, actuating one or more of the drive actuators. As discussed, this may include pressing or otherwise manipulating a throttle lever or button, or depressing a foot pedal.

The drive assembly may include any suitable structure to selectively enable the plurality of drive configurations. For example, switching between forward and reverse drive configurations may be implemented by reversing the polarity of the battery(ies) relative to the motor(s). As another example, relative speed configurations may be achieved by switching two or more batteries and/or two or more motors between series and parallel configurations.

As a further example, gears or similar mechanical structures may be utilized to configure relative speed configurations. As yet another example, a microprocessor or other controller may enable the configurations via predetermined programming. Continuing this example, relative speed configurations may be achieved through pulse-width modulation, or other duty cycle ramping, of the energization of the motor assembly.

Although particular drive configurations are discussed, other suitable drive configurations are included in the present disclosure. Similarly, the drive assembly may be configured, such as responsive to user inputs to the user input devices, to a drive configuration that includes more than one of the illustrative configurations described above. For example, a vehicle may be configured to such configurations as a low-speed forward configuration, a high-speed forward configuration, a low-speed reverse configuration, a high-speed reverse configuration, a medium-speed forward configuration, a medium-speed reverse configuration, etc.

The implementation of one or more selected drive configurations may occur prior to, simultaneous with, or after receipt of the configuration input(s). For example, a child may, via one or more configuration inputs, select a particular speed and/or direction drive configuration and thereafter, via an actuation input, drive the vehicle according to the selected drive configuration(s). As another example, a child may be driving the vehicle according to a particular drive configuration(s) and thereafter, via one or more configuration inputs, select a different drive configuration(s), such as a different direction or speed configuration. As yet another example, a user input device may provide both actuation and configuration inputs so that actuating the user input device both selects and implements one or more drive configurations.

User input devices 52 may be positioned in any suitable portion(s) of the body, such as positioned to receive inputs from a child sitting on the at least one seat. For example, the user input devices may be located in any suitable location within or near the seat so that a child sitting on seat 34 may reach those devices while positioned to operate the vehicle, such as while having at least one hand on the steering mechanism.

In some embodiments, control assembly 30 may include a controller 58, which may control the operation of the drive assembly responsive to at least one of received user inputs and predetermined programming. As an example, controller 58 may be adapted to control electronically the transmission of a user-selected speed to the driven wheel(s) and/or to configure the drive assembly to the user-selected drive configuration. Controller 58 may include a microprocessor or suitable control circuit. In the context of configuring the drive assembly to a selected drive configuration, the controller may be adapted to selectively enable or disable selected ones of the plurality of drive configurations responsive to user inputs, such as via user input devices 52, predetermined programming, and/or inputs from other sensors or switches.

When controller 58 is adapted to regulate the energization of the motor assembly, it may regulate electronically the rotational input transmitted by the motor(s) to the driven wheel(s). For example, controller 58 may regulate at least one of the timing and the ramp, or rate, of application of the transmission of the rotational input after actuation of a corresponding user input device by a child sitting on seat 34. In other words, the controller may be configured to delay in at least time and/or rate of transmission the rotational input to the driven wheel assembly responsive at least in part to a user input selecting the desired, or selected, rotational input. An example of a suitable controller is disclosed in U.S. Pat. No. 6,771,034, the complete disclosure of which is herein incorporated by reference for all purposes.

In some embodiments, controller 58 may selectively control the transmission of the selected rotation input (such as determined by the selected speed configuration and/or actuation input). In other words, controller 58 may be configured to control the transmission of the selected rotational input in certain situations, such as when certain parameters or thresholds are satisfied. For example, controller 58 may regulate the transmission of rotational input only when the selected rotational input occurs when the ride-on vehicle is already being driven (such as during a user-selected change in speed or direction), when the ride-on vehicle is already traveling at more than a predetermined speed (actual or selected), and/or when the ride-on vehicle changes direction.

The control assembly may be referred to as being configured to be in control communication with the drive and/or steering assemblies. "Control communication," as used herein, refers to the control assembly being physically connected, remotely connected, and/or connected in other suitable way(s) to allow the control assembly to convey user inputs to one or more other components of the children's ride-on vehicle, such as the drive and/or steering assemblies. Although control assembly 30 is shown to convey user inputs to drive assembly 26 and steering assembly 28, the control assembly may additionally, or alternatively, convey user inputs to other components of the children's ride-on vehicle.

Although children's ride-on vehicle 20 is shown to include body 22, wheel assembly 24, drive assembly 26, steering assembly 28, and control assembly 30, the children's ride-on vehicle may additionally, or alternatively, include any suitable structure configured to allow the children's ride-on vehicle to move across any suitable surface.

Figure 3:
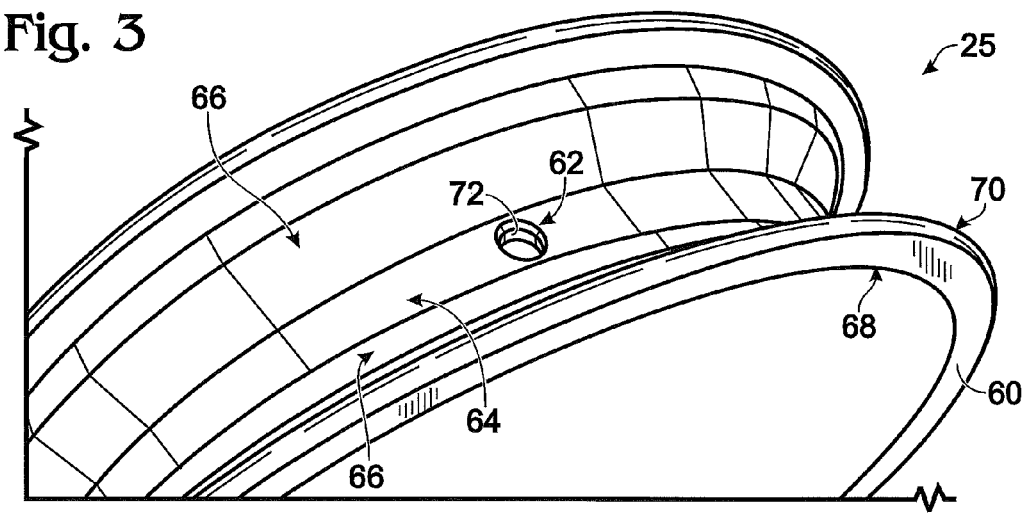
FIG. 3 is a partial isometric view of a wheel of the children's ride-on vehicle of FIG. 1 or FIG. 2 having an example of a tube-bursting region.
Figure 4:
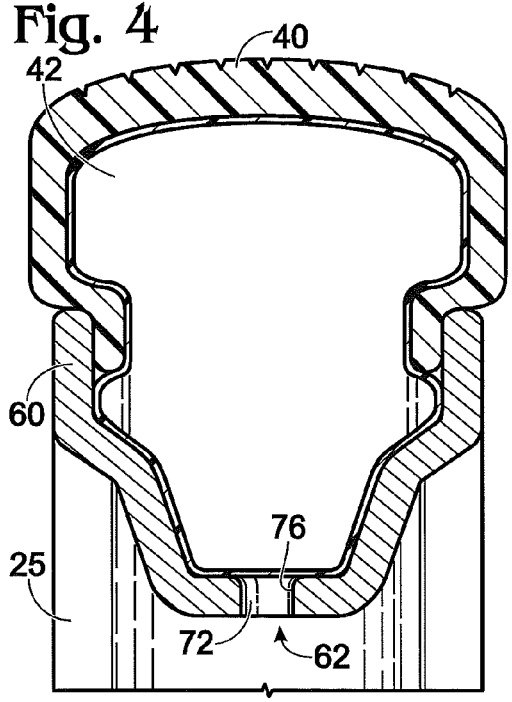
FIGS. 4-7 are sectional views of the wheel of FIG. 3 taken along lines 4-4 in FIG. 2, showing an inner tube bursting to prevent overinflation.

FIG. 3 shows an example of one or more wheels 25 of wheel assembly 24. Wheel 25 may include a rim 60 and at least one tube-bursting region 62. In some embodiments where the wheel includes a tube-bursting region, the wheel may be referred to as a "system for preventing overinflation of an inner tube." The rim may be any suitable shape(s) and/or size(s). Rim 60 may include a medial portion 64, one or more lateral portions 66, an inner circumference 68, and an outer circumference 70, as shown in FIGS. 3-4. Although rim 60 is shown to include a particular shape in those figures, the rim may alternatively, or additionally, include any suitable shape(s).

Tube-bursting region 62 may include any suitable structure configured to facilitate bursting of an associated inner tube, such as inner tube 42, when the associated inner tube is pressurized above a predetermined maximum pressure. The predetermined maximum pressure may be any suitable pressure, such as the maximum recommended operating pressure for the inner tube.

The predetermined maximum pressure also may be a suitable percentage of the maximum recommended operating pressure, such as 150%, 110%, 90%, or any suitable fraction of the maximum recommended operating pressure and/or another suitable pressure. The predetermined maximum pressure may be below the tube bursting pressure of the inner tube to ensure a controlled bursting at or adjacent the tube-bursting region.

The wheel may have any suitable number of tube-bursting regions, such as one, two, or three tube-bursting regions. The tube-bursting region may be on any suitable portion(s) of the wheel. For example, tube-bursting region 62 may be on medial portion 64 of the wheel. Alternatively, or additionally, the tube-bursting region may be on one or more of the lateral portions.

Tube-bursting region 62 may additionally, or alternatively, be located at any suitable position relative to a valve stem hole of the wheel (or a hole of the wheel that receives a valve stem of an inner tube). For example, the tube-bursting region may be 30 degrees, 33 degrees, 45 degrees, 90 degrees, 125 degrees, etc., from the valve stem hole. In some embodiments, the tube-bursting region may not be positioned directly across (or 180 degrees from the valve stem hole) because a user may patch an inner tube that burst and then install that inner tube in the same position with the patch adjacent to the tube-bursting region (which may change the pressure at which the inner tube may burst).

An example of tube-bursting region 62 is shown in FIG. 3 in the form of a hole or passage 72. The passage may extend through the rim or may extend to any suitable depth from the outer circumference. When passage 72 does not extend through the rim, the passage may be referred to as a recessed pocket or a recess 74.

Additionally, passage 72 may have any suitable dimensions, such as any suitable diameter, length, etc. The dimensions may be selected based on the predetermined maximum pressure, desired inner tube bursting pressure, material properties of the inner tube, the amount of inner tube bulge through the passage, and/or other factors. For example, the passage may have a diameter of 0.4275 inches, which may lead to an inner tube bulge of about 0.350 inches through the passage with that inner tube bursting at about 100 pounds per square inch (psi). Alternatively, the passage may have a diameter of 0.428 inches, which may lead to the inner tube to burst at about 90 psi.

Passage 72 may have any suitable shape(s). For example, the passage may have a cylindrical shape, a cubical shape, a rectangular prism shape, a truncated cone shape (or a frustum of a cone shape), a truncated pyramid shape (or a frustum of a pyramid shape), etc., and/or may have a circular cross-section, a rectangular cross-section, a square cross-section, etc. The shape(s) may additionally, or alternatively, be selected based on the predetermined maximum pressure, desired inner tube bursting pressure, material properties of the inner tube, the amount of inner tube bulge through the passage, and/or other factors.

Passage 72 may include at least one passage side 76, as shown in FIG. 4. In some embodiments, one or more of the passage sides may include one or more protuberances (not shown) and/or other structures that may change the tube-bursting characteristics of the passage. For example, the passage side may include one or more pins (not shown).

Figure 5:
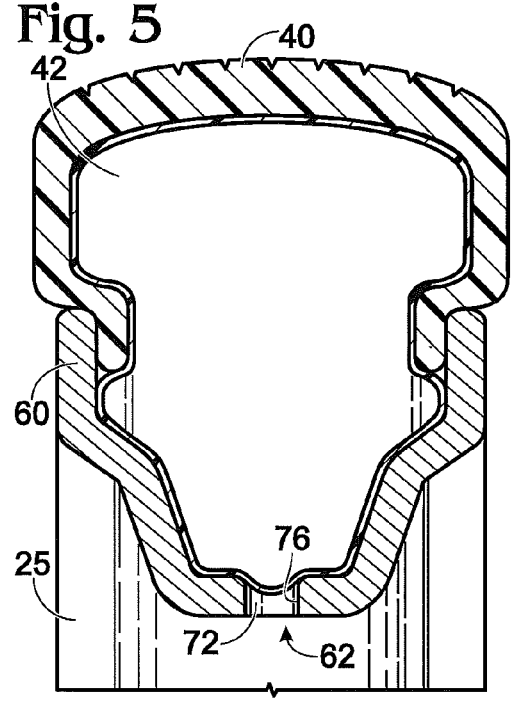
Figure 6:
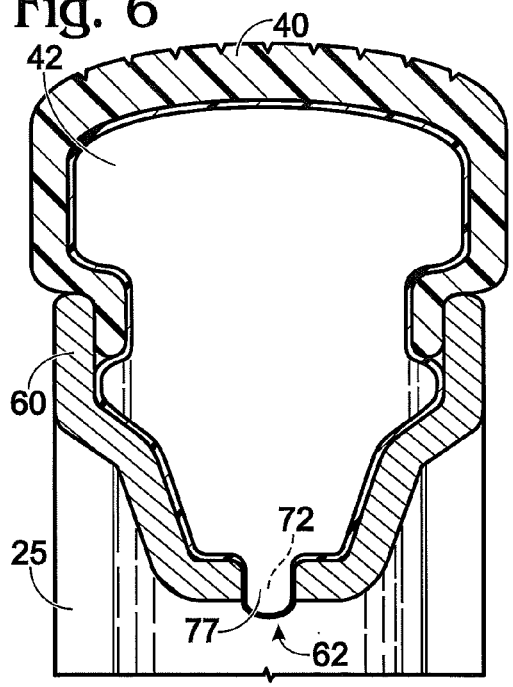
Figure 7:
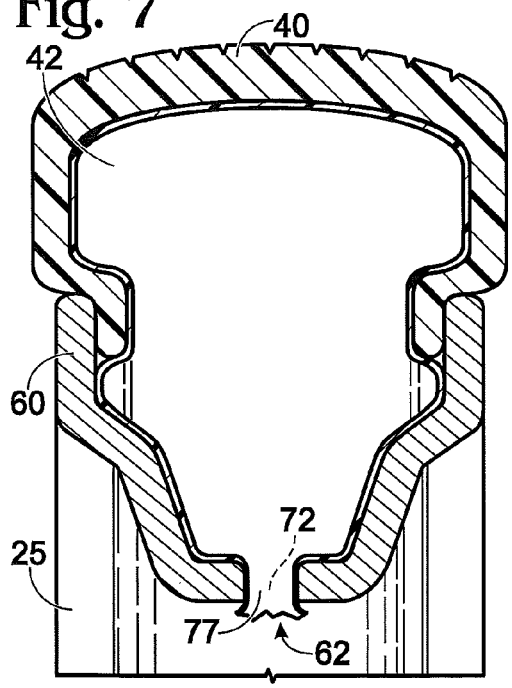

In operation, inner tube 42 may be positioned between wheel 25 and tire 40, as shown in FIG. 4. As the inner tube is pressurized, the inner tube may bulge, extend, or pucker into and/or through passage 72 of the rim, as shown in FIGS. 5-6. When the inner tube is pressurized above the predetermined maximum pressure, the inner tube may burst where it bulged into and/or through the passage (such as at a bulging portion 77) because of over-stretching, as shown in FIG. 7. Thus, the tube-bursting region may allow the inner tube to burst at a predetermined location about a predetermined maximum pressure.

FIG. 8 shows an example of a wheel having a passage 72 that has the shape of a truncated cone (or a frustum of a cone). The passage shown in FIG. 8 may have different tube-bursting characteristics as compared to the passage shown in FIGS. 4-7. For example, the passage shown in FIG. 8 may facilitate bursting of the inner tube at a pressure lower than the passage shown in FIGS. 4-7. Although passage 72 is shown to have the shape of a truncated cone, the passage may alternatively, or additionally, be any suitable shape(s) configured to facilitate bursting of an associated inner tube when the associated inner tube is pressurized above a predetermined maximum pressure.

Wheel 25 also may include at least one plug 78, as shown in FIG. 9. The plug may include any suitable structure configured to be positioned at least partially within passage 72 and/or to be moved away from the passage by inner tube 42 when the inner tube is pressurized above a predetermined plug-release pressure. Plug 78 may be made of any suitable materials, such as rubber and/or plastic materials.

The predetermined plug-release pressure may be any suitable pressure. For example, the predetermined plug-release pressure may be less than the predetermined maximum pressure, such at or slightly above the recommended operating pressure of the inner tube. The plug may thus be configured to alert a user that the pressure of the inner tube is beyond the recommended operating pressures and/or near the maximum operating pressure. Alternatively, the predetermined plug-release pressure may be equal to the predetermined maximum pressure.

In operation, plug 78 may be positioned at least partially within passage 72, as shown in FIG. 9. As the inner tube is pressurized above the predetermined plug-release pressure, the inner tube may bulge, extend, or pucker into and/or through passage 72 of the rim, which may move the plug away from the passage, as shown in FIGS. 10-11. When the inner tube is pressurized above the predetermined maximum pressure, the inner tube may burst where it bulged into and/or through the passage, as shown in FIG. 12.

Wheel 25 also may include at least one cover 80, as shown in FIG. 13. The cover may include any suitable structure configured to at least partially cover passage 72 and/or to uncover the passage when the inner tube is pressurized above a predetermined cover-opening pressure. A user may selectively extend the cover over the passage.

The predetermined cover-opening pressure may be any suitable pressure. For example, the predetermined cover-opening pressure may be less than the predetermined maximum pressure, such slightly above the recommended operating pressure of the inner tube. The cover may thus be configured to alert a user that the pressure of the inner tube is beyond the recommended operating pressure and/or near the maximum operating pressure. Alternatively, the predetermined cover-opening pressure may be equal to the predetermined maximum pressure.

In operation, cover 80 may be positioned to at least partially cover passage 72, as shown in FIG. 13. As the inner tube is pressurized above the predetermined cover-opening pressure, the inner tube may bulge, extend, or pucker into and/or through passage 72 of the rim, which may open the cover, as shown in FIG. 14. When the inner tube is pressurized above the predetermined maximum pressure, the inner tube may burst where it bulged into and/or through the passage, as shown in FIG. 14.

Figure 15:
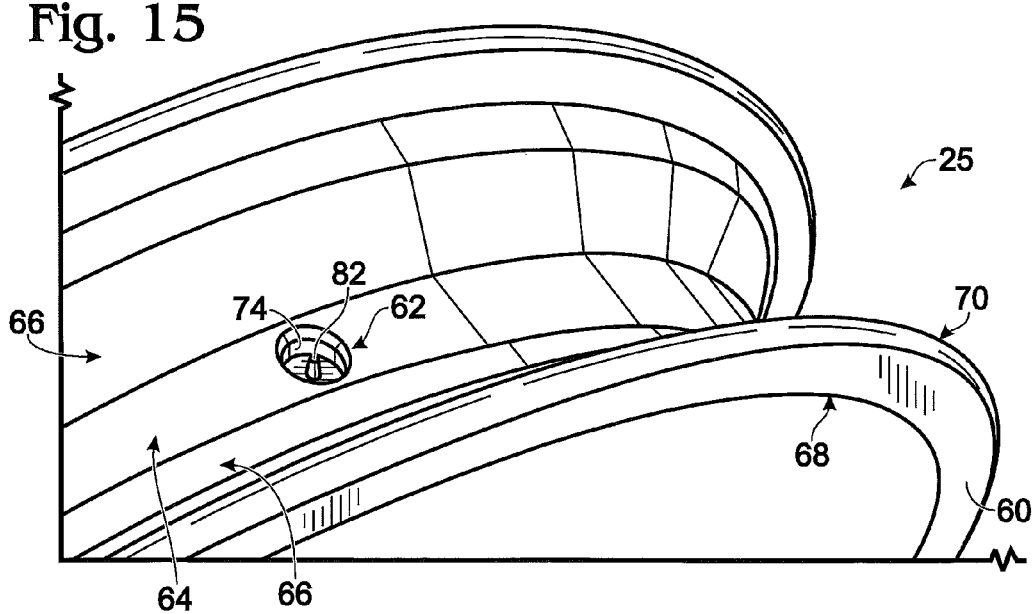
FIG. 15 is a partial isometric view of a wheel of the children's ride-on vehicle of FIG. 1 or FIG. 2 having another example of a tube-bursting region.

When passage 72 does not extend through the rim (i.e., does not extend between the inner and outer circumferences of the rim), tube-bursting region may additionally include at least one projection 82, as shown in FIG. 15. For example, the projection may be positioned at least partially within the passage or the recess. The projection may include any suitable structure configured to facilitate bursting of the inner tube when the inner tube is pressurized above the predetermined maximum pressure, such as a pin, a needle, etc.

Projection 82 may be formed with the recess or may be attached to the recess. The passage may include any suitable number of projections, such as one, two, three, etc. Additionally, projection 82 may include any suitable dimensions and/or structure, such as a 0.03 inch flat top pin.

In operation, inner tube 42 may be positioned between wheel 25 and tire 40, as shown in FIG. 16. As the inner tube is pressurized, the inner tube may bulge, extend, or pucker into and/or through passage 72 of the rim, as shown in FIG. 17. When the inner tube is pressurized above the predetermined maximum pressure, the inner tube may contact the projection, which may cause the inner tube to be punctured by the projection and burst, as shown in FIG. 18.

Wheel 25 and tube-bursting region 62 may include any suitable combination(s) of the structures discussed above, or may particularly exclude one or more of those structures. For example, wheel 25 may be free from a cover that a user selectively extends over the passage.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

The invention claimed is:

1. A tire system, comprising:
   a wheel including a rim and a tube-bursting region;
   a tire coupled to the rim; and
   an inner tube, wherein at least a portion of the inner tube is disposed between the rim and the tire;
   wherein the tube-bursting region is configured to facilitate bursting of the inner tube directly responsive to the inner tube being pressurized above a predetermined maximum pressure;
   wherein the tube-bursting region includes a passage that extends through the rim and is configured to facilitate bursting of the inner tube when the inner tube is pressurized above the predetermined maximum pressure; and
   wherein the tube-bursting region further includes a plug that is positioned at least partially within the passage and is configured to be moved relative to the passage by the associated inner tube when the associated inner tube is pressurized above a predetermined plug-release pressure.

2. The system of claim 1, wherein the tube-bursting region is further configured to not facilitate bursting of the inner tube when the inner tube is pressurized to a pressure that is less than the predetermined maximum pressure.

3. The system of claim 1, wherein the tube-bursting region is configured to automatically facilitate bursting of the inner tube at a predetermined location when the inner tube is pressurized above the predetermined maximum pressure.

4. The system of claim 1, wherein the predetermined maximum pressure is greater than a maximum recommended operating pressure of the inner tube.

5. The system of claim 1, wherein the predetermined maximum pressure is a maximum recommended operating pressure of the inner tube.

6. The system of claim 1, wherein the predetermined maximum pressure is less than a maximum recommended operating pressure of the inner tube.

7. The system of claim 1, wherein the predetermined maximum pressure is 90% of a maximum recommended operating pressure of the inner tube.

8. The system of claim 1, wherein the predetermined maximum pressure is approximately 100 psi.

9. The system of claim 1, wherein the predetermined maximum pressure is approximately 90 psi.

10. The system of claim 1, wherein the rim includes an inner circumference and an outer circumference, the passage extends between the inner and outer circumferences and is defined by at least one passage side disposed between the inner and outer circumferences.

11. The system of claim 1, wherein the predetermined plug-release pressure is less than the predetermined maximum pressure.

12. The system of claim 1, wherein the predetermined plug-release pressure is equal to the predetermined maximum pressure.

13. A tire system, comprising:
a wheel including a rim and a tube-bursting region;
a tire coupled to the rim; and
an inner tube, wherein at least a portion of the inner tube is disposed between the rim and the tire;
wherein the tube-bursting region is configured to facilitate bursting of the inner tube directly responsive to the inner tube being pressurized above a predetermined maximum pressure;
wherein the tube-bursting region includes a recess on the rim; and
wherein the tube-bursting region further includes a projection that is positioned at least partially within the recess and is configured to facilitate bursting of the inner tube when the inner tube is pressurized above the predetermined maximum pressure.

14. A children's ride-on vehicle, comprising:
a body having at least one seat sized for a child; and
a plurality of wheel assemblies rotatably coupled to the body, wherein at least one wheel assembly of the plurality of wheel assemblies includes the tire system of claim 1.

15. The children's ride-on vehicle of claim 14, wherein the plurality of wheel assemblies includes a steerable wheel and a driven wheel, and wherein the children's ride-on vehicle further comprises:
a battery-powered drive assembly configured to selectively drive rotation of the driven wheel, the battery-powered drive assembly including:
an electric motor;
a user input device positioned to receive inputs from a child sitting on the seat and configured to actuate the electric motor; and
a battery configured to selectively energize the motor.

16. The system of claim 13, wherein the tube-bursting region is further configured to not facilitate bursting of the inner tube when the inner tube is pressurized to a pressure that is less than the predetermined maximum pressure.

17. The system of claim 13, wherein the tube-bursting region is configured to automatically facilitate bursting of the inner tube at a predetermined location when the inner tube is pressurized above the predetermined maximum pressure.

18. The system of claim 13, wherein the predetermined maximum pressure is greater than a maximum recommended operating pressure of the inner tube.

19. The system of claim 13, wherein the predetermined maximum pressure is a maximum recommended operating pressure of the inner tube.

20. The system of claim 13, wherein the predeteirnined maximum pressure is less than a maximum recommended operating pressure of the inner tube.

21. The system of claim 13, wherein the predetermined maximum pressure is 90% of a maximum recommended operating pressure of the inner tube.

22. The system of claim 13, wherein the predetettnined maximum pressure is approximately 100 psi.

23. The system of claim 13, wherein the predetermined maximum pressure is approximately 90 psi.

24. A children's ride-on vehicle, comprising:
a body having at least one seat sized for a child; and
a plurality of wheel assemblies rotatably coupled to the body, wherein at least one wheel assembly of the plurality of wheel assemblies includes the tire system of claim 13.

25. The children's ride-on vehicle of claim 24, wherein the plurality of wheel assemblies includes a steerable wheel and a driven wheel, and wherein the children's ride-on vehicle further comprises:
a battery-powered drive assembly configured to selectively drive rotation of the driven wheel, the battery-powered drive assembly including:
an electric motor;
a user input device positioned to receive inputs from a child sitting on the seat and configured to actuate the electric motor; and
a battery configured to selectively energize the motor.

* * * * *

UNITED STATES PATENT AND TRADEMARK OFFICE
CERTIFICATE OF CORRECTION

| | | |
|---|---|---|
| PATENT NO. | : 8,251,083 B2 | |
| APPLICATION NO. | : 13/041572 | |
| DATED | : August 28, 2012 | |
| INVENTOR(S) | : Ronald M. Asbach and William R. Howell | |

It is certified that error appears in the above-identified patent and that said Letters Patent is hereby corrected as shown below:

Column 12, line 19, claim 20, after "20. The system of claim 13, wherein the" please delete "predeteirnined" and insert --predetermined-- therefor.

Column 12, line 25, claim 20, after "22. The system of claim 13, wherein the" please delete "predetettnined" and insert --predetermined-- therefor.

Signed and Sealed this
Sixteenth Day of October, 2012

David J. Kappos
*Director of the United States Patent and Trademark Office*